(12) United States Patent
Betz et al.

(10) Patent No.: US 10,315,616 B2
(45) Date of Patent: Jun. 11, 2019

(54) INSERTION TONGUE

(71) Applicant: TRW AUTOMOTIVE GMBH, Alfdorf (DE)

(72) Inventors: Hans-Peter Betz, Böbingen (DE); Ralf Knoedl, Alfdorf (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 15/527,338

(22) PCT Filed: Nov. 17, 2015

(86) PCT No.: PCT/EP2015/002290
§ 371 (c)(1),
(2) Date: May 17, 2017

(87) PCT Pub. No.: WO2016/087019
PCT Pub. Date: Jun. 9, 2016

(65) Prior Publication Data
US 2017/0355349 A1    Dec. 14, 2017

(30) Foreign Application Priority Data

Dec. 3, 2014 (DE) .......................... 10 2014 017 788

(51) Int. Cl.
*B60R 22/185* (2006.01)
*B60R 22/18* (2006.01)
*A44B 11/25* (2006.01)

(52) U.S. Cl.
CPC ....... *B60R 22/1855* (2013.01); *A44B 11/2561* (2013.01); *B60R 2022/1812* (2013.01)

(58) Field of Classification Search
CPC . A44B 11/2557; A44B 11/2553; A44B 11/10; B60R 2022/1812; B60R 22/1855; Y10T 24/4084
See application file for complete search history.

(56) References Cited

U.S. PATENT DOCUMENTS 4,291,918 A * 9/1981 Finn ................... A44B 11/2557
24/193
5,471,714 A * 12/1995 Olson .................... A44B 11/10
24/171
(Continued)

FOREIGN PATENT DOCUMENTS

DE      102014007125 A1 * 11/2015 ......... A44B 11/2553
WO      2013099590         7/2013

*Primary Examiner* — Robert Sandy
*Assistant Examiner* — Michael S Lee
(74) *Attorney, Agent, or Firm* — Tarolli, Sundheim, Covell & Tummino LLP

(57) ABSTRACT

In a locking tongue (10) for a seat belt comprising an inserting portion (12) adapted to be inserted in a belt buckle and a deflecting portion (14) for webbing, wherein the deflecting portion (14) includes a webbing passage (20) as well as a clamping element (22) for the webbing and the clamping element (22) is movable between a home position in which the webbing is freely movable and a blocking position in which the clamping element is moved against a wall of the webbing passage so that the webbing is clamped between the clamping element (22) and the wall of the webbing passage (20), and wherein at least one spring element (34) is provided for forcing the clamping element (22) into the home position, it is provided that the spring element (34) is formed integrally on the deflecting portion (14).

9 Claims, 2 Drawing Sheets

(56) References Cited

U.S. PATENT DOCUMENTS

| | | | |
|---|---|---|---|
| 2006/0138852 A1 | 6/2006 | Ichida | |
| 2012/0068520 A1* | 3/2012 | McFalls | A44B 11/2553 |
| | | | 297/468 |
| 2012/0286501 A1 | 11/2012 | Goudeau et al. | |
| 2016/0000190 A1* | 1/2016 | Knoedl | A44B 11/2557 |
| | | | 24/171 |
| 2016/0206050 A1* | 7/2016 | Aoyagi | A44B 11/2561 |
| 2017/0055643 A1* | 3/2017 | Knoedl | A44B 11/2553 |
| 2017/0297528 A1* | 10/2017 | Hermann | B60R 22/1855 |

* cited by examiner

INSERTION TONGUE

RELATED APPLICATIONS

This application corresponds to PCT/EP2015/002290, filed Nov. 17, 2015, which claims the benefit of German Application No. 10 2014 017 788.2, filed Dec. 3, 2014, the subject matter of which are incorporated herein by reference in their entirety.

BACKGROUND OF THE INVENTION

The invention relates to a locking tongue for a seat belt comprising an inserting portion adapted to be inserted in a belt buckle and a deflecting portion for webbing, wherein the deflecting portion includes a webbing passage as well as a clamping element for the webbing and the clamping element is movable between a home position in which the webbing is freely movable and a blocking position in which the clamping element is moved against a wall of the webbing passage so that the webbing is clamped between the clamping element and the wall of the webbing passage, and wherein at least one spring element is provided for acting upon the clamping element in the home position.

In three-point seat belts locking tongues form a deflecting point between a first section of the seat belt which in the case of restraint restrains the pelvis of the vehicle occupant and a second section which protects the upper body part of the vehicle occupant from a forward out-of-position movement. The locking tongue is threaded onto the webbing of the seat belt with the deflecting section so that the locking tongue can be freely displaced on the webbing. In this way, when fastening the seat belt, the length of the two sections of the seat belt can be adapted to the vehicle occupant. In addition, by displacing the webbing through the locking tongue the webbing can be oriented so that the latter is evenly adjacent to the vehicle occupant.

In the case of restraint, the upper body part may happen to move forward when the seat belt is blocked. Since the webbing is movably guided in the locking tongue, the webbing can be displaced so that the section contacting the upper body part is extended and the section contacting the pelvis is shortened, which may cause the seat belt to constrict the pelvis region. In order to prevent this, locking tongues include clamping elements which in the case of blocking of the seat belt may be displaced between a home position in which the webbing is freely movable and a blocking position in which the clamping element clamps the webbing to the locking tongue so that no webbing displacement is possible between the first and second sections of the seat belt. In this way, the pelvis region is protected against constriction by the seat belt and the upper body part is protected against excessive forward out-of-position movement.

In order to return the clamping element to the home position after completion of the case of restraint, spring elements are provided for acting upon the clamping element in the home position. Usually, for this purpose spiral springs or leaf springs are employed. Such locking tongue is known, for example, from DE 20 2010 013 986 U1. Said spring elements in addition have the function to maintain the clamping element in the borne position free from play so that any noise by rattling of the clamping element is prevented or at least reduced. For this purpose, it is required, however, to mount the spring elements to the locking tongue while they are biased. The large number of individual parts and the mounting of the spring elements under bias render the assembly of the locking tongues very complicated.

SUMMARY OF THE INVENTION

It is the object of the invention to provide a locking tongue which can be mounted more easily and quickly and enables bearing of the clamping element free from play.

For achieving the object a locking tongue for a seat belt is provided comprising an inserting portion adapted to be inserted in a belt buckle and a deflecting portion for webbing, wherein the deflecting portion includes a webbing passage and a clamping element for the webbing and the clamping element is movable between a home position in which the webbing is freely movable and a blocking position in which the clamping element is moved against a wall of the webbing passage so that the webbing is clamped between the clamping element and the wall of the webbing passage. At least one spring element is provided for acting upon the clamping element in the home position. According to the invention, the spring element is formed integrally with the deflecting portion. Since the spring element is formed integrally with the deflecting portion, additional working steps during assembly for inserting, orienting and fixing or holding the spring elements are omitted. Since the spring element is tightly arranged on the deflecting portion, in addition it cannot get out of place during assembly of the clamping web so that a reliable functioning of the locking tongue, especially of the spring elements, is ensured.

The spring element may be formed integrally with a base of the locking tongue, for example. Preferably, the locking tongue has an overmolding, especially made from plastic material and the spring element is formed integrally with the overmolding. Usually the base is made from a hard material, especially metal, having low flexibility, which renders the integral design of a spring element very costly. Forming the spring element at the overmolding which is usually made from plastic material offers the advantage that the plastic material is by far more elastic so that a more flexible spring element may be provided. In addition, the manufacture of the locking tongue is easier, as it is not necessary to keep the spring elements free when the overmolding is applied so that the functioning thereof is not impaired. Moreover, the guideway along which the clamping element is guided at the deflecting portion between the home position and the blocking position is usually configured at least in portions in the overmolding. Hence the clamping element may be manufactured along with the overmolding so that it projects into the guideway.

The spring element is a leaf spring, for example, a free end of which projects into a guideway in which the clamping element is guided. Such leaf spring may be easily manufactured, especially when an overmolding is produced, as no additional molded parts are required for manufacturing such leaf spring. The length and, resp., the thickness of the leaf spring additionally allows for appropriately adjusting the spring strength.

In order to further facilitate the manufacture of the locking tongue, preferably a retaining pin is provided on which the clamping element is supported. The clamping element may be inserted into the guideway which has, for example, two guide passages open to one side. Subsequently, the retaining pin is fixed to the deflecting portion so that the clamping element is retained in the guideway. The retaining pin may be inserted e.g. perpendicularly to the guideway into the deflecting portion, especially into the overmolding, and in the inserted position closes the guide passages so that the clamping element cannot be moved out of the latter any more.

BRIEF DESCRIPTION OF THE DRAWINGS

Further advantages and features are found in the following description in connection with the enclosed drawings, wherein.

DESCRIPTION

Figure 1:
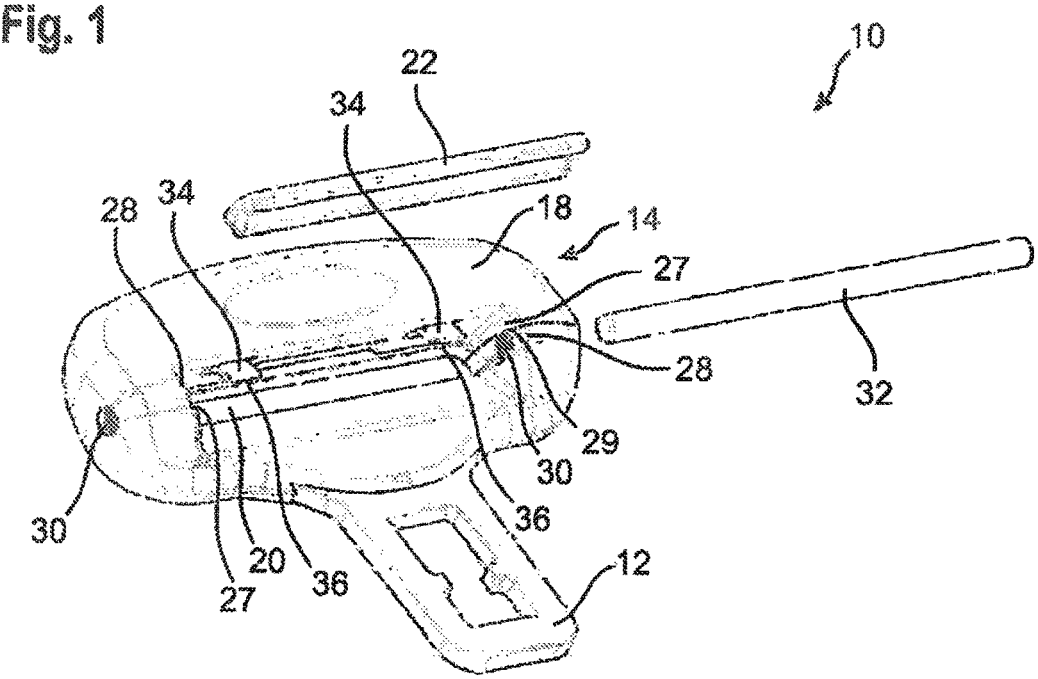
FIG. 1 shows an exploded view of a locking tongue according to the invention.
Figure 2:
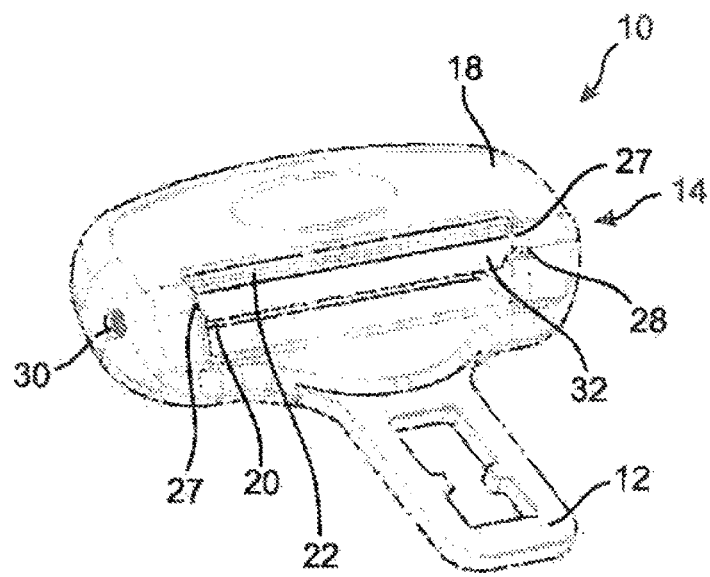
FIG. 2 shows the locking tongue of FIG. 1 in the mounted state.

In FIGS. 1 and 2 a locking tongue 10 for a seat belt in a vehicle is illustrated. The locking tongue 10 has an inserting portion 12 adapted to be inserted into a belt buckle and to be looked in the same as well as a deflecting portion 14 adapted to be threaded onto webbing 16 and to deflect said webbing 16.

The deflecting portion 14 includes an overmolding 18 made from plastic material which completely encloses the deflecting portion 14. At the deflecting portion 14 a webbing passage 20 through which the webbing 16 is guided (cf. FIG. 3) as well as a clamping element 22 are provided the functioning of which will be explained hereinafter.

The webbing 16 is deflected in U-shape by the deflecting portion 14, the webbing 16 being guided with a clamping portion 23 around the clamping element 22 and through the webbing passage 20. The clamping portion 23 divides the webbing 16 into a first section 24 and a second section 26, the first section 24 being guided around the pelvis region of a vehicle occupant and the second section 26 extending around the upper body part of the vehicle occupant starting from the locking tongue 10.

Figure 3:
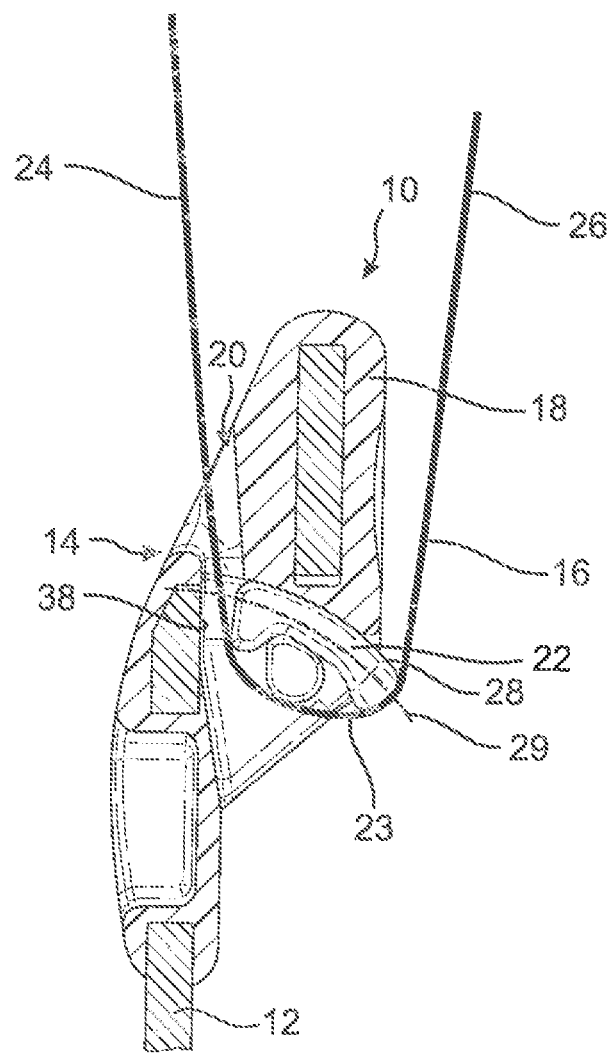
FIG. 3 shows a sectional view of the locking tongue of FIG. 2.

In the initial state of the locking tongue 10 shown in FIG. 3 the webbing 16 is freely movable through the deflecting portion 14 of the locking tongue 10 so that, in connection with a belt retractor, adaptation in length of the two sections 24, 26 of the webbing 16 is possible. In this way, the seat belt can be adjusted so that both sections 24, 26 are adjacent to the vehicle occupant. Thus, when the seat belt blocks, forward out-of-place movement of the vehicle occupant is reliably prevented.

As is evident from FIGS. 1 and 2, the clamping element 22 is supported laterally in guide passages 27 in which the clamping element 22 is movable along a guideway 29 from a home position to the blocking position. The guide passages 27 are open to one side so that the clamping element 22 can be inserted into the guide passages 27 from the open ends 28.

In the area of the open ends 28 passages 30 for a retaining pin 32 extending transversely to the guide passages 27 are provided at the overmolding 18.

For mounting the locking tongue 10 the clamping web 22 is introduced from the open ends 28 into the guide passages 27. In order to prevent the clamping element 22 from slipping out of the guide passages 27, the retaining pin 32 is subsequently inserted into the passages 30 in an inserting direction E. The retaining pin 32 projects into the guideway 29 so that the clamping element 22 is prevented from falling or slipping out. In addition, the retaining pin 32 forms a stop for the clamping element 22, as will be explained hereinafter.

As is further evident from FIG. 1, two spring elements 34 each of which forms a leaf spring are integrally formed at the overmolding 18. Each of the free ends 36 of the spring elements 34 projects into the guideway 29 of the clamping element 22. The spring elements 34 are formed integrally with the overmolding 18 and are preferably injection-molded to the base of the locking tongue 10 together with said overmolding.

The spring elements 34 are shaped so that the clamping element 22 is adjacent thereto when it is inserted in the guideway 29 and, resp., in the guide passages 27. The spring elements 34 force the clamping element 22 into a home position in which the clamping element 22 contacts the retaining pin 32. In said home position the webbing 16 is freely movable in the webbing passage 20.

When, in the case of restraint, a tensile force acts on the webbing 16 and, resp., on the two sections 24, 26 of the webbing 16, the clamping element 22 is displaced from the home position to the blocking position, when said tensile force is stronger than the spring force of the spring elements 34. In the blocking position the cross-section of the webbing passage 20 is narrowed by the clamping element 22 so that the webbing 16 is clamped. For example, the clamping element 22 clamps the webbing 16 against a wall 38 of the webbing passage 20.

In this position of the clamping element 22 the webbing 16 is fixed to the locking tongue 10. Hence shortening of the first section 24 and thus constriction of the first section 24 laid around the pelvis by a forward displacement of the upper body part and the extension of the second section 28 resulting therefrom are reliably excluded.

When the case of restraint is completed and the tensile force acting on the webbing 16 and, resp., on the sections 24, 26 of the webbing 16 decreases, the clamping element 22 is returned to the home position by the spring force of the spring elements 34.

The configuration of the spring elements 34 integrally with either the overmolding 18 or the locking tongue 10 offers the advantage that a substantially easier and quicker mounting of the locking tongue 10 is possible. It is not necessary to insert and align separate spring elements in a complicated manner and to fix said spring elements during the inserting operation of the clamping element 22. The clamping element 22 merely has to be fixed against the spring force of the spring elements 34 until the retaining pin 32 has been inserted into the passages 30, thus causing the clamping element 22 to be fixed to the locking tongue 10.

Other than in the embodiment shown here, any shapes of the spring elements 34 are possible, as a matter of course. It is merely required to form the spring elements 34 integrally with the deflecting portion 14, especially with the overmolding 18, and to shape them so that they force the clamping element 22 into the home position.

The invention claimed is:

1. A locking tongue (10) for a seat belt, comprising:
an inserting portion (12) adapted to be inserted into a belt buckle; and
a deflecting portion (14) for a webbing (16), the deflecting portion (14) including a webbing passage (20) through which the webbing (16) is guided and a clamping element (22) for the webbing (16), the clamping element (22) being movable between a home position in which the webbing is freely movable and a blocking position in which the clamping element (22) is moved against a wall of the webbing passage (20) so that the webbing (16) is clamped between the clamping element (22) and the wall of the webbing passage (20);

wherein at least one spring element (34) is provided for forcing the clamping element (22) to the home position, the at least one spring element (34) being formed integrally on the deflecting portion (14).

2. The locking tongue (10) according to claim 1, wherein the at least one spring element (34) is formed integrally with an overmolding (18) on a base of the locking tongue (10).

3. The locking tongue (10) according to claim 1, wherein the at least one spring element (34) is a leaf spring projecting with a free end (36) into a guideway (29) along which the clamping element (22) is movable between the home position and the blocking position.

4. The locking tongue (10) according to claim 1, wherein a retaining pin (32) is provided on which the clamping element (22) is supported.

5. The locking tongue (10) according to claim 4, wherein the clamping element (22) is inserted into a guideway (29) along which the clamping element (22) is movable between the home position and the blocking position, the retaining pin (32) being inserted into the guideway (29) to prevent the inserted clamping element (22) from egressing from the guideway (29).

6. The locking tongue (10) according to claim 5, wherein the guideway (29) has two guide passages (27) that each have an open end (28), the clamping element (22) being inserted into the guide passages (27) from the open ends (28), the retaining pin (32) being inserted into the guideway (29) to close the open ends (28) and prevent the inserted clamping element (22) from egressing from the guideway (29) and the guide passages (27).

7. The locking tongue (10) according to claim 3, wherein the at least one spring element (34) projects with the free end (39) from an overmolding (18) into the guideway (29), the overmolding (18) enclosing the deflecting portion (14).

8. The locking tongue (10) according to claim 1, wherein the at least one spring element (34) is injection-molded to a base of the locking tongue (10) together with an overmolding (18) so that the at least one spring element (34) is formed integrally with the overmolding (18).

9. The locking tongue (10) according to claim 8, wherein the at least one spring element (34) and the overmolding (18) are made from plastic material.

* * * * *